United States Patent
Hughes et al.

(10) Patent No.: US 10,540,281 B2
(45) Date of Patent: Jan. 21, 2020

(54) CACHE ALLOCATION BASED ON QUALITY-OF-SERVICE MONITORING

(71) Applicant: ARM Limited, Cambridge (GB)

(72) Inventors: Paul Stanley Hughes, Whittlesford (GB); Michael Andrew Campbell, Waterbeach (GB)

(73) Assignee: Arm Limited, Cambridge (GB)

( * ) Notice: Subject to any disclaimer, the term of this patent is extended or adjusted under 35 U.S.C. 154(b) by 24 days.

(21) Appl. No.: 15/407,681

(22) Filed: Jan. 17, 2017

(65) Prior Publication Data

US 2018/0203798 A1    Jul. 19, 2018

(51) Int. Cl.
  *G06F 12/00* (2006.01)
  *G06F 12/0804* (2016.01)
  *G06F 12/121* (2016.01)
  *G06F 12/127* (2016.01)
  *G06F 12/122* (2016.01)
  *G06F 12/123* (2016.01)
  *G06F 12/0888* (2016.01)

(52) U.S. Cl.
  CPC ...... *G06F 12/0804* (2013.01); *G06F 12/0888* (2013.01); *G06F 12/121* (2013.01); *G06F 12/122* (2013.01); *G06F 12/123* (2013.01); *G06F 12/127* (2013.01); *G06F 2212/1016* (2013.01)

(58) Field of Classification Search
  None
  See application file for complete search history.

(56) References Cited

U.S. PATENT DOCUMENTS

| 6,038,645 A * | 3/2000 | Nanda ................. G06F 12/0804 711/133 |
| 6,282,617 B1 * | 8/2001 | Tirumala .............. G06F 12/127 711/133 |
| 6,401,175 B1 * | 6/2002 | Tremblay ............ G06F 12/0804 711/131 |
| 6,434,673 B1 * | 8/2002 | Palanca ............... G06F 12/0859 711/100 |
| 2008/0104329 A1 * | 5/2008 | Gaither ............... G06F 12/0888 711/138 |
| 2014/0089559 A1 * | 3/2014 | Cai ....................... G06F 12/126 711/102 |
| 2016/0203085 A1 * | 7/2016 | Kranich ............. G06F 12/0802 713/2 |

* cited by examiner

Primary Examiner — Reginald G Bragdon
Assistant Examiner — Michael L Westbrook
(74) Attorney, Agent, or Firm — Leveque IP Law, P.C.

(57) ABSTRACT

A cache to provide data caching in response to data access requests from at least one system device, and a method operating such a cache, are provided. Allocation control circuitry of the cache is responsive to a cache miss to allocate an entry of the multiple entries in the data caching storage circuitry in dependence on a cache allocation policy. Quality-of-service monitoring circuitry is responsive to a quality-of-service indication to modify the cache allocation policy with respect to allocation of the entry for the requested data item. The behaviour of the cache, in particular regarding allocation and eviction, can therefore be modified in order to seek to maintain a desired quality-of-service for the system in which the cache is found.

14 Claims, 7 Drawing Sheets

CACHE ALLOCATION BASED ON QUALITY-OF-SERVICE MONITORING

TECHNICAL FIELD

The present disclosure relates to data processing. More particularly it relates to a cache provided in a data processing apparatus to provide data caching capability for at least one master device.

BACKGROUND

A data processing apparatus may be provided with data caching capability, so that data items do not need to be retrieved from memory each time they are accessed, but rather are temporarily stored locally whilst they are frequently accessed, and as a consequence the latency associated with the memory access is largely avoided. A data cache may be provided to support the data processing activities of just one component of a data processing apparatus (and is sometimes referred to as a "level 1" cache) or may be provided to support the data processing activities of a number of components of the data processing apparatus (and is sometimes referred to as a system cache).

SUMMARY

At least one example described herein provides a cache to provide data caching in response to data access requests from at least one system device comprising: data caching storage circuitry having multiple entries to cache data items returned from memory in response to the data access requests; allocation control circuitry responsive to absence of a requested data item in the data caching storage circuitry to allocate an entry of the multiple entries in the data caching storage circuitry in dependence on a cache allocation policy; and quality-of-service monitoring circuitry responsive to a quality-of-service indication to modify the cache allocation policy with respect to allocation of the entry for the requested data item.

At least one example described herein provides a method of operating a cache to provide data caching in response to data access requests from at least one system device comprising: caching data items returned from memory in response to the data access requests in data caching storage having multiple entries; in response to absence of a requested data item in the data caching storage, allocating an entry of the multiple entries in the data caching storage in dependence on a cache allocation policy; and modifying the cache allocation policy with respect to allocation of the entry for the requested data item in response to a quality-of-service indication.

At least one example described herein provides a cache to provide data caching in response to data access requests from at least one system device comprising: means for caching data items returned from memory in response to the data access requests in data caching storage having multiple entries; means for allocating an entry of the multiple entries in the data caching storage in dependence on a cache allocation policy in response to absence of the requested data item in the data caching storage; and means for modifying the cache allocation policy with respect to allocation of the entry for the requested data item in response to a quality-of-service indication.

BRIEF DESCRIPTION OF THE DRAWINGS

The present techniques will be described further, by way of example only, with reference to embodiments thereof as illustrated in the accompanying drawings, in which.

DESCRIPTION OF EXAMPLE EMBODIMENTS

Figure 1A:
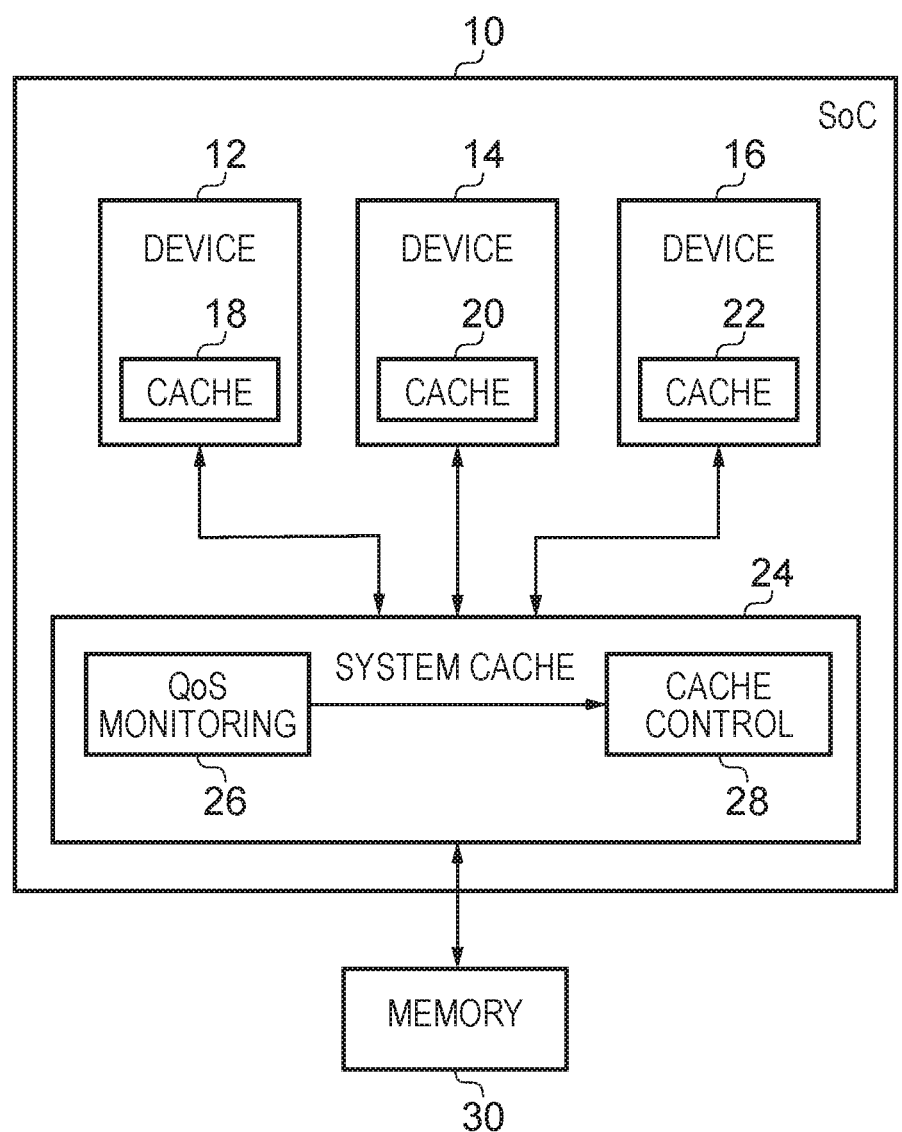
FIG. 1A schematically illustrates a data processing apparatus embodied as a system-on-chip comprising a system cache in one embodiment.

In some example embodiments there is a cache to provide data caching in response to data access requests from at least one system device comprising: data caching storage circuitry having multiple entries to cache data items returned from memory in response to the data access requests; allocation control circuitry responsive to absence of a requested data item in the data caching storage circuitry to allocate an entry of the multiple entries in the data caching storage circuitry in dependence on a cache allocation policy; and quality-of-service monitoring circuitry responsive to a quality-of-service indication to modify the cache allocation policy with respect to allocation of the entry for the requested data item.

The present techniques recognise that in a data processing system which comprises a cache which services data access requests from at least one system device, not only does that at least one system device itself place a demand on the memory access bandwidth available, but also that the cache itself consumes memory access bandwidth. For example, on a cache miss the cache may choose to allocate a line of data into the cache. When there are no empty locations in the cache, the cache selects a "victim" line of the cache to be replaced with new data. This victim line of data may be "dirty" (i.e. locally modified), meaning that this data has to be written back to the memory so that the modification is not lost. As such two accesses to the memory take place, firstly the writing back of the dirty data and secondly the reading of the new data to be allocated into the cache. In the worst-case scenario the cache may be full of dirty data meaning that any allocation into the cache will result in a write back in addition to the read. Moreover, contemporary systems are often designed so that some use cases make use of a very high proportion of the available memory access bandwidth, and in this context the present techniques recognise that if the behaviour of the cache takes available memory access bandwidth away from the requesting master(s), in some circumstances this could mean that performance requirements cannot be met (e.g. for a real-time master with specific timing requirements). Indeed, it is recognised that memory access bandwidth is not the only system characteristic which could be adversely affected by the cache behaviour, and hence more generally the present techniques seek to make use of a quality-of-service metric when modifying the cache behaviour. The particular modification of the cache behaviour proposed by the present techniques is a modification of the cache allocation policy. Quality-of-service monitoring circuitry is provided to monitor a quality-of-service indication and, when appropriate, to modify the cache allocation policy in dependence on that quality-of-service indication. In other words it is envisaged that the cache can generally operate using a default cache allocation policy, which may take a variety of forms as are known to one of ordinary skill in the art. However, the provision of the quality-of-service monitoring circuitry means that the cache allocation policy is modified in dependence on the quality-of-service indication. This modification of the cache allocation policy may take a variety of forms, but in general the present techniques are proposed with the aim that the modification will reduce the "system burden" of the operation of the cache in some manner. For example, in the light of the above discussed consumption of memory access bandwidth by the cache, the modification of the cache allocation policy may seek to effect a reduction in that memory access bandwidth consumption during the time when real-time performance requirements could not otherwise be met.

There can be a variety of different ways in which the cache allocation policy is modified as a result of the quality-of-service indication, but in some embodiments the quality-of-service monitoring circuitry is responsive to the quality-of-service indication to prevent allocation for the requested data item in a dirty entry of the multiple entries, wherein the dirty entry holds at least one data item marked as locally modified. By preventing allocation in a dirty entry of the cache, which would therefore require writing back to memory, the memory access bandwidth consumption associated with that writing back is avoided.

In some embodiments the quality-of-service monitoring circuitry is responsive to the quality-of-service indication to cause allocation for the requested data item in a clean entry of the multiple entries, wherein the clean entry holds no data items marked as locally modified. By ensuring that the allocation can only take place in a clean entry in the cache, which will therefore not require writing back to memory, the memory access bandwidth consumption associated with that writing back is avoided. In other words, the quality-of-service indication is overriding the cache allocation decision which would have been made if the object were just to optimise for the cache itself (i.e. cache hit rate), and hence a clean entry is chosen when a dirty entry would otherwise have been selected.

In some embodiments the quality-of-service monitoring circuitry is responsive to the quality-of-service indication to prevent allocation for the requested data item in any entry of the data caching storage circuitry. By preventing any allocation for the requested data item, the cache is effectively bypassed and the read data is passed directly to the requesting master, and any additional memory access bandwidth consumption associated with the cache is avoided.

In circumstances where there are multiple clean entries in the cache there are various ways in which the victim line of data may be selected. In other words this is the circumstance when there are multiple entries which do not hold any data items which are marked as locally modified (and are thus described as "clean"). In some embodiments the quality-of-service monitoring circuitry is responsive to presence of multiple clean entries holding data items marked as locally unmodified in the data caching storage circuitry to select one of the multiple clean entries for allocation for the requested data item on a randomized basis. In some embodiments the quality-of-service monitoring circuitry is responsive to presence of multiple clean entries holding data items marked as locally unmodified in the data caching storage circuitry to select one of the multiple clean entries for allocation for the requested data item on a least-recently-used basis. These "randomized" and "least-recently-used" approaches may in fact be approximations (sometimes referred to as "pseudo-random" and "pseudo-LRU") depending on the system capabilities.

In some embodiments the cache comprises transaction queue circuitry to hold at least one data transaction pending transmittal to memory, and the quality-of-service indication is a status indication received from the transaction queue circuitry. When such a transaction queue is provided for the cache, the present techniques recognise that the behaviour and operation of that queue may affect the system performance, in particular where the queue operates close to full capacity and therefore the opportunity arises for the queue to stall.

The transaction queue circuitry may take a variety of forms, but in some embodiments the transaction queue circuitry comprises eviction queue circuitry to hold at least one modified data item which has been evicted from the data caching storage circuitry pending a write-back of the at least one modified data item to memory, and the quality-of-service indication is a status indication received from the eviction queue circuitry. Such an eviction queue can be provided so that data evicted from the cache is placed into this queue and can be held there until the memory system is able to carry the dirty data to the memory. The same queue may also be provided to handle the fetching of read data from the memory and in this case may then be referred to as a fetch and evict queue. Uninterrupted operation of such a queue can be important to realise the performance demands of the master(s) of the system, and therefore that performance can be supported by the modification of the cache allocation policy, according to the present techniques where such modification will promote the uninterrupted operation of the eviction queue.

The status indication received from eviction queue circuitry may take a variety of forms, but in some embodiments the status indication indicates that at least a threshold number of modified data items are currently held in the eviction queue circuitry pending write-back to memory. This threshold number may be variously defined as appropriate for the system performance requirements which should be supported, but may for example be set such that the status indication shows that the eviction queue is full. In the circumstance where the eviction queue is full it is recognised that an overall improvement in system performance may result from temporarily avoiding the addition of another modified data item to the eviction queue, and this aim may be achieved by the above discussed (temporary) modification of the cache allocation policy.

In some embodiments the transaction queue circuitry further provides a shared memory transaction queue to hold pending memory transactions for multiple system devices, and the quality-of-service indication is an indication that allocating an entry of the multiple entries in the data caching storage circuitry for caching the requested data item according to the cache allocation policy would cause a number of entries in the shared memory transaction queue for a given system device to fall below a threshold minimum. For example the shared memory transaction queue could form part of a memory controller which administers all memory transactions for the system (i.e. for the multiple system devices which issue data access requests and for the cache). In such circumstances it may be the case that in order to maintain a minimum performance standard for each of the multiple system devices, there should always be a minimum number of entries in the shared memory transaction queue available to each system device. Where the shared memory transaction queue also holds entries generated by the cache (i.e. relating to evictions or fetches), the present techniques recognise that the behaviour of the cache could cause the number of entries in the shared memory transaction queue available to a given system device to fall below that minimum number. Accordingly in such embodiments the number of entries in the shared memory transaction queue associated with each system device is monitored and where an allocation in the cache would cause the minimum number of entries to be jeopardized (by the eviction of a data item which would then occupy an entry in the shared memory transaction queue), the cache allocation policy is then modified to avoid that allocation.

The present techniques further propose that the above-mentioned threshold minimum number of entries in the shared memory transaction queue for a given system device may vary, and in some embodiments the quality-of-service monitoring circuitry is responsive to comparison of at least one system performance measurement with at least one system performance objective to dynamically set the threshold minimum. The system performance measurement and the system performance objective may be variously defined, but in principle any performance characteristic which is recognised potentially to be affected by the cache behaviour could be measured and a corresponding objective set.

Similarly, at least one of the system devices may have a performance metric defined for it which should be met, and hence in some embodiments the cache further comprises system performance monitoring circuitry to maintain a performance metric value for the at least one system device, wherein the quality-of-service monitoring circuitry responsive to an outcome of a comparison of the performance metric value with respect to a performance threshold value to modify the cache allocation policy with respect to the allocation of the entry for the requested data item.

The performance characteristic which is monitored and maintained by this mechanism may take a variety of forms, but in some embodiments the system performance monitoring circuitry comprises bandwidth monitoring circuitry to maintain a bandwidth performance value for at least one system device, wherein the quality-of-service monitoring circuitry responsive to an outcome of a comparison of the bandwidth performance value with respect to a bandwidth performance threshold value to modify the cache allocation policy with respect to the allocation of the entry for the requested data item.

The bandwidth performance value may be measured and/or maintained in a variety of ways. However in some embodiments the bandwidth monitoring circuitry is responsive to elapse of a predetermined time period to decrease the bandwidth performance value and is responsive to issuance of an access to memory for the at least one system device to increase the bandwidth performance value. Accordingly by this mechanism a measure of the bandwidth which has been consumed by a particular system device can be maintained, where each access for that system device causes the value to rise, and the elapse of time causes the value to fall. The net result is that a stable bandwidth performance value is maintained if the system device is afforded regular memory accesses, but if these accesses do not occur with sufficient frequency (e.g. because they are stalled) then the bandwidth performance value will fall.

The cache may be implemented in a variety of contexts, in some examples with just one system device making use of the cache, but in some embodiments the cache is a system cache to provide data caching in response to data access requests from multiple system devices.

In some example embodiments there is a method of operating a cache to provide data caching in response to data access requests from at least one system device comprising: caching data items returned from memory in response to the data access requests in data caching storage having multiple entries; in response to absence of a requested data item in the data caching storage, allocating an entry of the multiple entries in the data caching storage in dependence on a cache allocation policy; and modifying the cache allocation policy with respect to allocation of the entry for the requested data item in response to a quality-of-service indication.

In some example embodiments there is a cache to provide data caching in response to data access requests from at least one system device comprising: means for caching data items returned from memory in response to the data access requests in data caching storage having multiple entries; means for allocating an entry of the multiple entries in the data caching storage in dependence on a cache allocation policy in response to absence of the requested data item in the data caching storage; and means for modifying the cache allocation policy with respect to allocation of the entry for the requested data item in response to a quality-of-service indication.

Some particular embodiments will now be described with reference to the figures.

FIG. 1A schematically illustrates a system-on-chip (SoC) 10, which interacts with a memory 20. The system-on-chip 10 comprises three devices 12, 14, 16 each of which accesses data stored in the memory 20. In order to reduce the latency associated with an access to the memory 20, each of the devices 12, 14, 16 is provided with its own respective level 1 (L1) cache 18, 20, 22. Moreover, the system-on-chip 10 further comprises a system cache 24 shared by each of the devices 12, 14, 16 and via which data access requests which could not be serviced by the respective L1 cache of the requesting device are passed. The system cache 24 is shown to comprise quality-of-service monitoring circuitry 26 and cache control circuitry 28, where the cache control circuitry 28 is arranged to receive a signal from the quality-of-service monitoring circuitry 26. Most notably in the present context, the cache control circuitry 28 administers a cache allocation policy for the system cache 24, which dictates when and how a victim cache line is selected when a cache miss occurs. The cache control circuitry 28 can modify the application of the cache allocation policy when a cache miss occurs, in dependence on the signal(s) that it receives from the quality-of-service monitoring circuitry 26. In particular one or more quality-of-service indications are received by the cache control circuitry 28 from the quality-of-service monitoring circuitry 26. More detail of the arrangement of these components of the system cache and their interaction will be described below with reference to the figures follow.

Figure 1B:
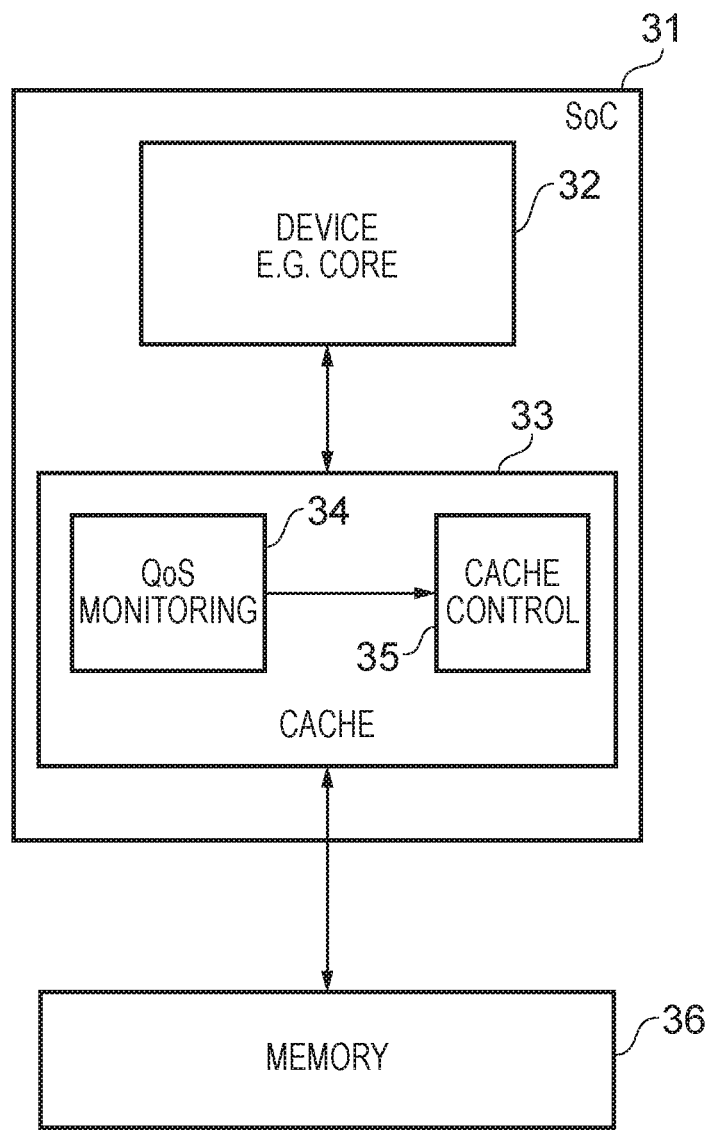
FIG. 1B schematically illustrates a data processing apparatus embodied as a system-on-chip comprising a device having a private cache in one embodiment.

FIG. 1B schematically illustrates a system-on-chip (SoC) 31, which interacts with a memory 36. The system-on-chip 31 is shown here as only comprising one device 32 which accesses data stored in the memory 36. As in the case of FIG. 1A, in order to reduce the latency associated with an access to the memory 36, the device 32 is provided with its own private cache 33. This private cache 33 is shown to comprise quality-of-service monitoring circuitry 34 and cache control circuitry 35, where the cache control circuitry 35 is arranged to receive a signal from the quality-of-service monitoring circuitry 34. As in the case of the example of FIG. 1A, the cache control circuitry 35 administers a cache allocation policy for the cache 33, which dictates when and how a victim cache line is selected when a cache a cache miss occurs. The following examples illustrated with respect to the remaining figures are equally applicable to either of the contexts of FIG. 1A or 1B, where it will be understood that where arbitration for requests from multiple systems devices is illustrated and discussed this is only applicable to the context of FIG. 1A.

Figure 2:
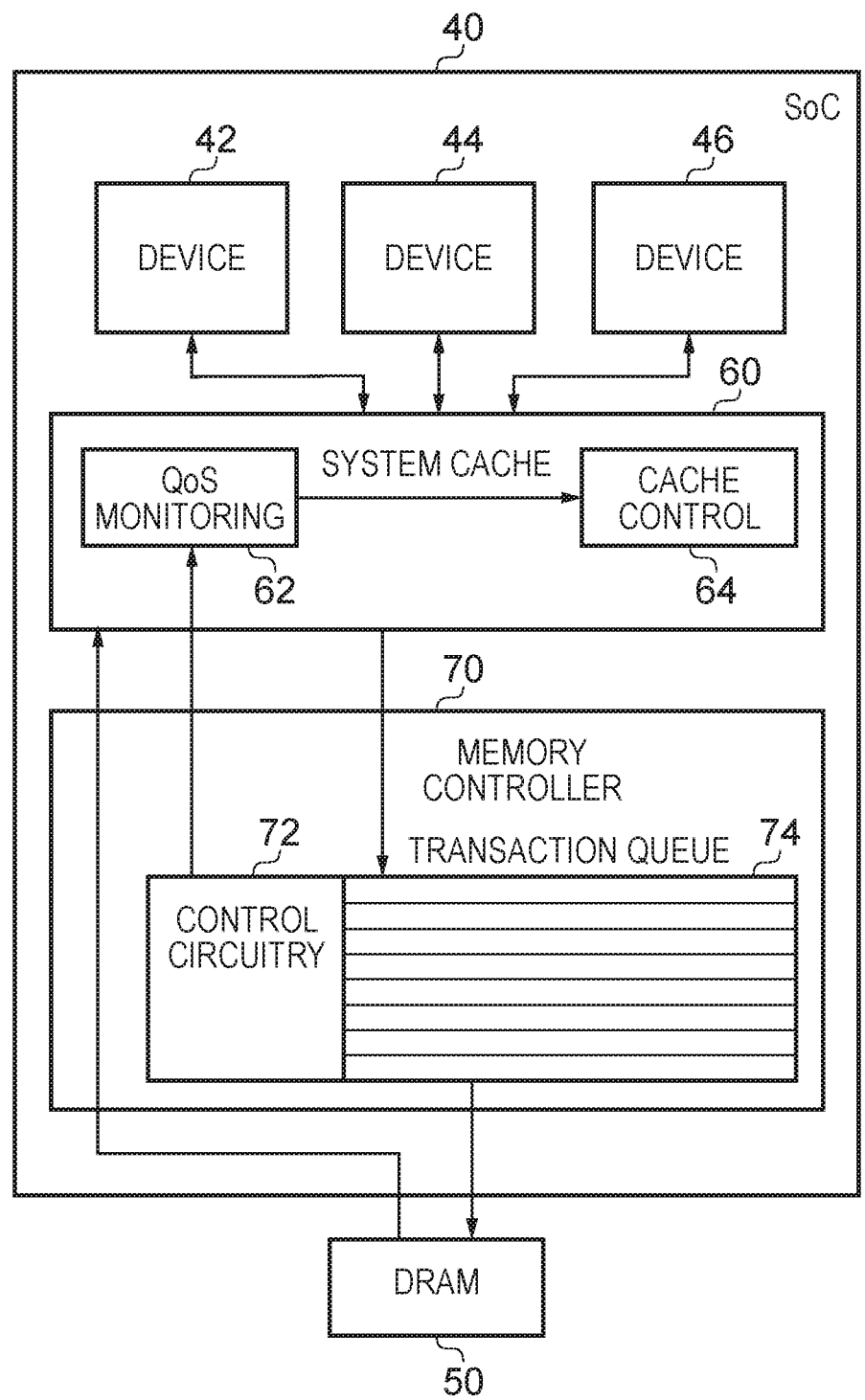
FIG. 2 schematically illustrates a data processing apparatus embodied as a system-on-chip comprising a memory controller and a system cache in one embodiment.
Figure 3:
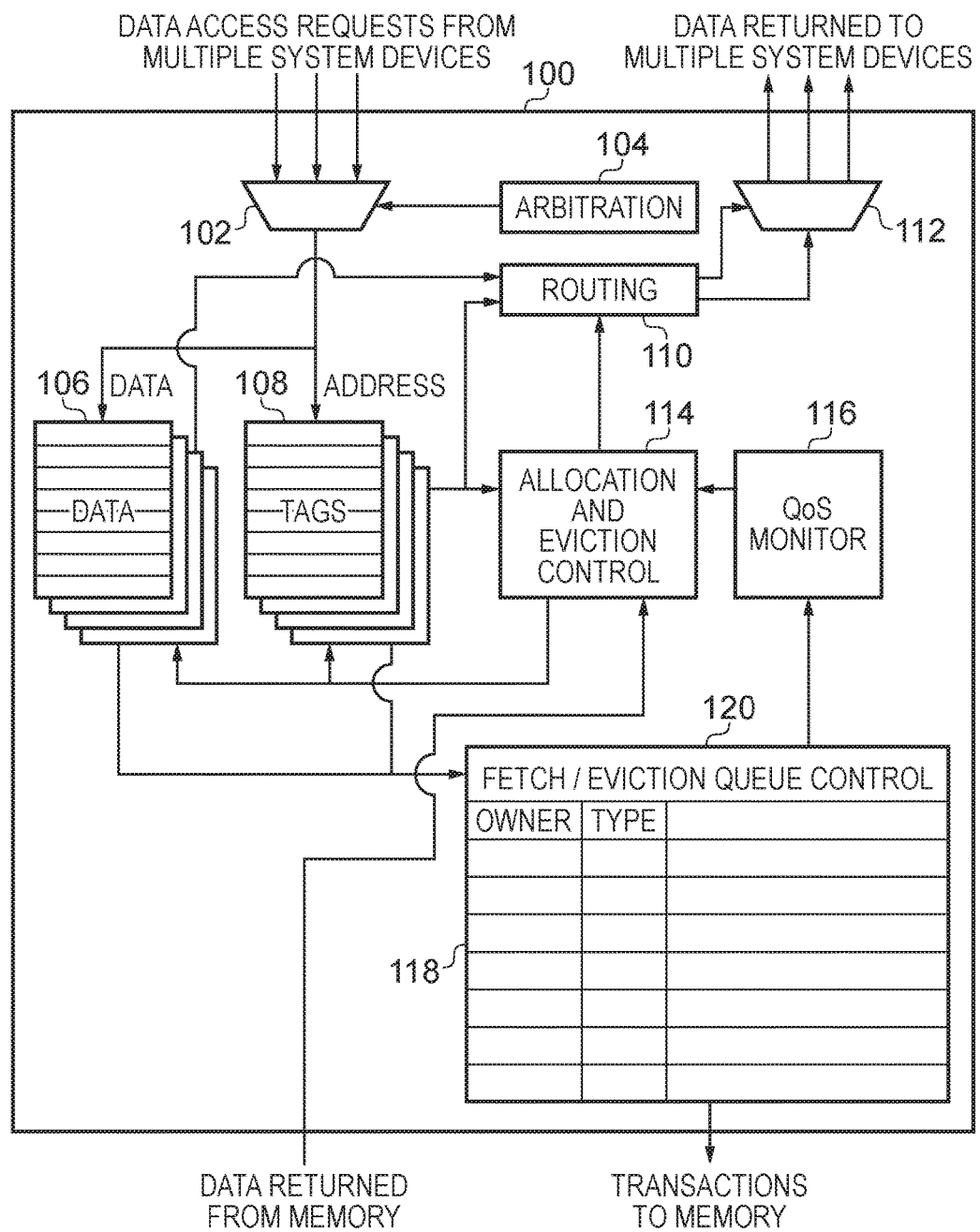
FIG. 3 schematically illustrates in more detail the configuration of a system cache in one embodiment.

FIG. 2 schematically illustrates another system-on-chip (SoC) 40, which also interacts with a memory 50. Here the memory 50 is shown to be a DRAM, although the particular nature of the memory is not significant. As in the example of FIG. 1A this system-on-chip 40 also comprises three devices 42, 44, 46 each of which access data stored in the DRAM 50. The system-on-chip 40 further comprises a system cache 60 shared by each of the devices 42, 44, 46 and via which all data access requests generated by those devices are passed. As in the examples of FIGS. 1A and 1B, the (system) cache 60 comprises quality-of-service monitoring circuitry 62 and cache control circuitry 64, where the cache control circuitry 64 is arranged to receive a signal (a quality-of-service indication) from the quality-of-service monitoring circuitry 62. The system-on-chip 40 further comprises a memory controller 70, which administers all memory accesses for the system-on-chip 40. The memory controller 70 comprises control circuitry 72 and a transaction queue 74. Memory accesses generated by the system cache 16 (i.e. read requests and eviction write-backs) are queued in the transaction queue 74 before being passed to the DRAM 50. The control circuitry 72 administers the use of the transaction queue 74 and monitors its status. One or more aspects of this status can be signalled by the control circuitry 72 of the memory controller 70 to the quality of service monitoring circuitry 62 of the system cache 60. Accordingly, this or these aspects of the status of the transaction queue may form the basis for the quality of service indication sent from the quality of service monitoring circuitry 62 to the cache control circuitry 64 and on the basis of which the cache allocation policy may be (temporarily) modified. This enables the system to protect the performance of the transaction queue in the memory controller, for example by causing the system cache to avoid generating an eviction write-back when it is known that the transaction queue is already full (or very close to full) and thus that the write-back would either itself stall, or could cause other memory transactions to stall. In the context of FIG. 3 it is also worth noting that the quality-of-service monitoring circuitry 62 can also affect the behaviour of other parts of the system—for example the likelihood of the memory controller to switch from servicing reads to servicing writes to bring the queue below the threshold. Hence it should be appreciated that the quality-of-service monitoring circuitry 62 can seek to address quality-of-service issues in the system in various ways, of which the techniques relating to the modification of the cache allocation policy described herein are only one approach.

FIG. 3 schematically illustrates in more detail the configuration of a system cache 100 in one embodiment. However, absent the multiple inputs/outputs and arbitration/routing logic, and ownership label in the fetch/eviction queue, this cache could represent a private cache. The system cache 100 is arranged to receive data access requests from multiple system devices and for this purpose multiplexer 102 is provided under control of the arbitration logic 104. The system cache 100 is shown in FIG. 3 as being configured as a set associative cache comprising multiple data ways 106 and address ways 108. When a data access request is received and can be serviced by the existing content of the cache 100, the corresponding data (when required, i.e. by a read request) is read out and passed via the routing circuitry 110, to the multiplexer 112 in order to be returned to the respective requesting system device. Conversely a write request which hits in the cache causes the locally stored copy of the relevant data item to be updated. However, a cache miss (signalled from the tag ways 108 to the allocation and eviction control circuitry 114), will generally cause the allocation and eviction control circuitry 114 to allocate a cache line for storage of the requested data (once it is returned from memory) and to select a victim cache line for that purpose (where the content of that victim cache line will be written back to memory, if dirty). Nevertheless, as shown in FIG. 3 the system cache 100 further comprises quality-of-service monitoring circuitry 116 and this component receives status indications from the fetch/eviction queue 118. Specifically it receives these indications from the fetch/eviction queue control circuitry 120. The fetch/eviction queue control circuitry 120 is arranged to signal a number of different status indications to the quality of service monitoring circuitry 116, each of which essentially indicating that the allocation and eviction control circuitry 114 should modify the cache allocation policy. One status indication which the fetch/eviction queue control circuitry 120 signals to the quality-of-service monitoring circuitry 116 is the occupancy of the queue. When the occupancy of the queue reaches a predefined threshold, this signal is sent. For example, the predefined threshold may be set such that the signal is sent when queue is full. Note also that the entries of the fetch/eviction queue 120 can be marked to indicate their owner (i.e. the requesting system device) and to indicate the type of transaction. The fetch/eviction queue control circuitry 120 is also arranged to monitor the number of entries for each system device and the type of each transaction. When any of these monitored values falls to (or below) a predefined minimum, this can be signalled to the quality-of-service monitoring circuitry 116. Depending on the particular system configuration, in turn the quality-of-service monitoring circuitry 16 can then signal to the allocation and eviction control circuitry 114 that the cache allocation policy should be (temporarily) modified in order to maintain system performance.

Figure 4:
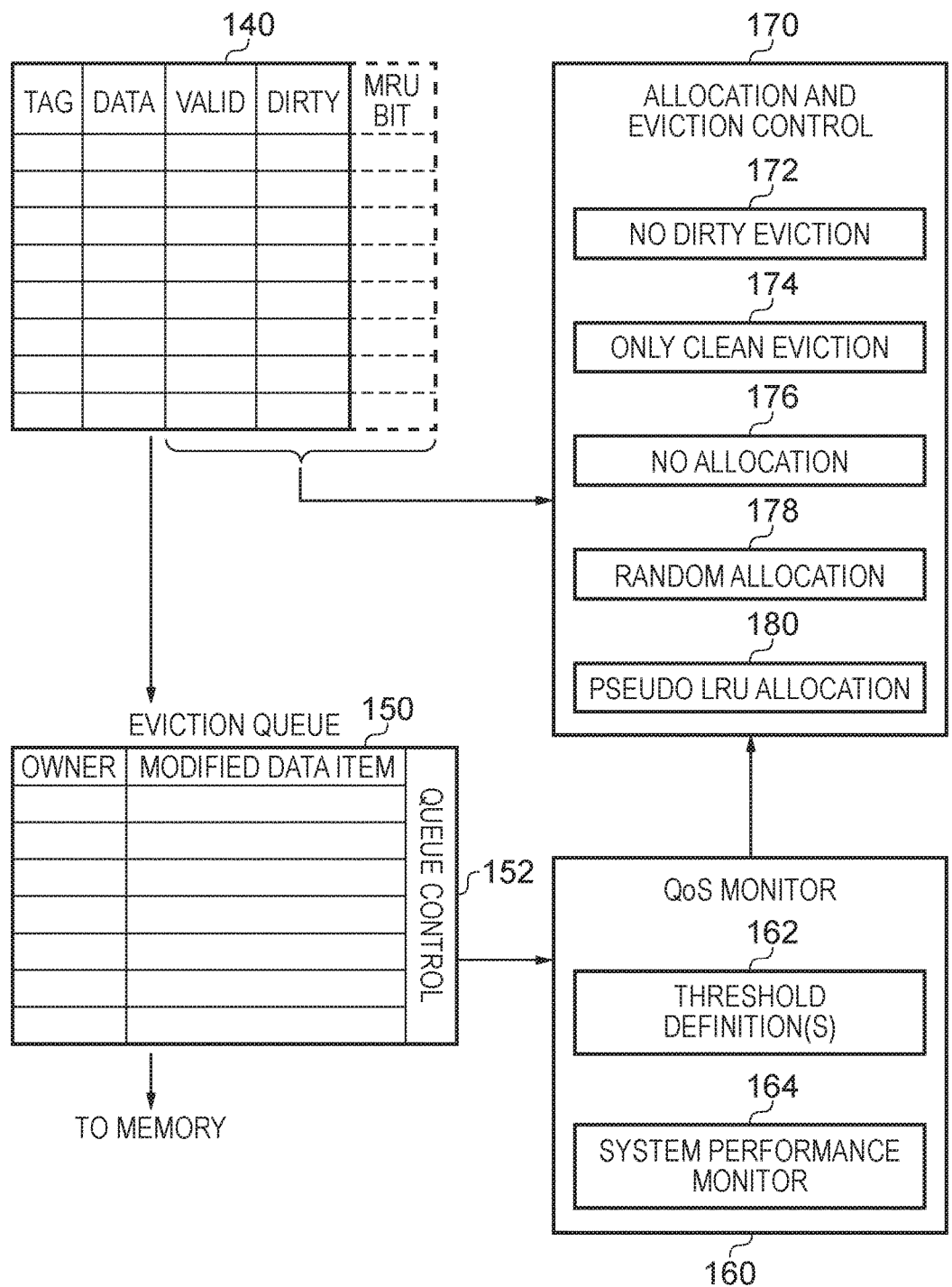
FIG. 4 schematically illustrates the interaction of a cache storage, an eviction queue, a quality-of-service monitor, and an allocation and eviction control of a system cache in one embodiment.

Further detail of the interaction between the cache storage of a cache, its associated eviction queue, its allocation and eviction control circuitry, and its quality-of-service monitoring circuitry in one embodiment is now discussed with reference to FIG. 4. As shown in FIG. 4 each entry (cache line) stored in the cache storage 140 comprises a tag portion and the data portion, and the entry can be labelled as valid (or not) and dirty (or not). The further label "MRU bit" (most recently used bit) relates to the pseudo least recently used (LRU) allocation policy discussed below and the dashed lines indicate that this is a variant on the embodiment illustrated (when the pseudo LRU allocation policy is implemented).

Entries in the cache storage 140 which are evicted and require writing back to memory (because they are dirty) are queued in the eviction queue 150. Each modified data item can also be labelled with its owner (i.e. the requesting system device). As described above with reference to the fetch/eviction queue control circuitry 120 in FIG. 3, the eviction queue control circuitry 152 monitors the status of the eviction queue 150 and can signal to the quality-of-service monitoring circuitry 160 when a predefined criterion is met, for example when the occupancy of the eviction to meets a predetermined threshold. The queue control 152 also signals to the quality-of-service monitoring circuitry 160 when an entry in the queue is issued to memory, along with an indication of the owning device (when this is a shared system cache). The system performance monitor 164 of the quality-of-service monitoring circuitry 160 maintains a bandwidth performance value for each owning device (requesting master), incrementing the value when such an indication of a queued entry is issued to memory and decrementing the value after the elapse of predetermined time period. The resulting value for each owning device is monitored and compared against a respective threshold definitions 162 also held by the quality-of-service monitoring circuitry 160. If one or more of the bandwidth performance value falls below its respective threshold definition, the quality-of-service monitoring circuitry 160 sends a corresponding quality-of-service indication to the allocation and eviction control circuitry 170. The system performance monitor 164 of the quality-of-service monitoring circuitry 160 can also receive other performance metrics from elsewhere in the system, compare them against respective threshold definitions 162, and send a corresponding quality-of-service indication to the allocation and eviction control circuitry 170 when required. In response the allocation and eviction control circuitry 170 can implement a number of different cache allocation policy variations, i.e. absent a signal from the quality-of-service monitoring circuitry, the allocation and eviction control circuitry 170 implements one or more default allocation policies, but in response to a signal from the quality-of-service monitoring circuitry one of these variations on those policies can be triggered. These are schematically illustrated in FIG. 4 as:

"no dirty eviction" 172, according to which the cache is prevented from causing the eviction of a cache line which is marked as dirty;

"only clean eviction" 174, according to which the cache can only cause the eviction of cache lines which are not marked as dirty;

"no allocation" 176, according to which the cache cannot allocate a cache line in response to a cache miss;

"random allocation" 178, according to which the cache picks amongst multiple clean candidate victim cache lines on a randomised basis (NB: it will be appreciated that such "random" allocation may commonly be implemented in a manner which might more strictly speaking be called "pseudo-random"); and "pseudo LRU allocation" 180, according to which the cache picks amongst multiple clean candidate victim cache lines on a "pseudo LRU" basis.

For the purpose of the latter "pseudo LRU allocation" 180 the cache makes use of the above-mentioned MRU bit in the cache storage 140. The MRU bit is set for the cache line which has been most recently allocated and in order to select a victim cache line the allocation and eviction control circuitry 170 selects a clean (i.e. "dirty" is not set) cache line with the lowest index where the MRU bit is not set. In response to the quality-of-service indication received from the quality-of-service monitoring circuitry 160 the allocation and eviction control circuitry 170 can implement one of the above described cache allocation policies as a variant on a default cache allocation policy. It will be recognised that the purpose of each of these variant cache allocation policies is to seek to reduce the impact of the system cache on the available memory access bandwidth, in particular by temporarily preventing the system cache from adding another entry to the eviction queue 150.

Figure 5:
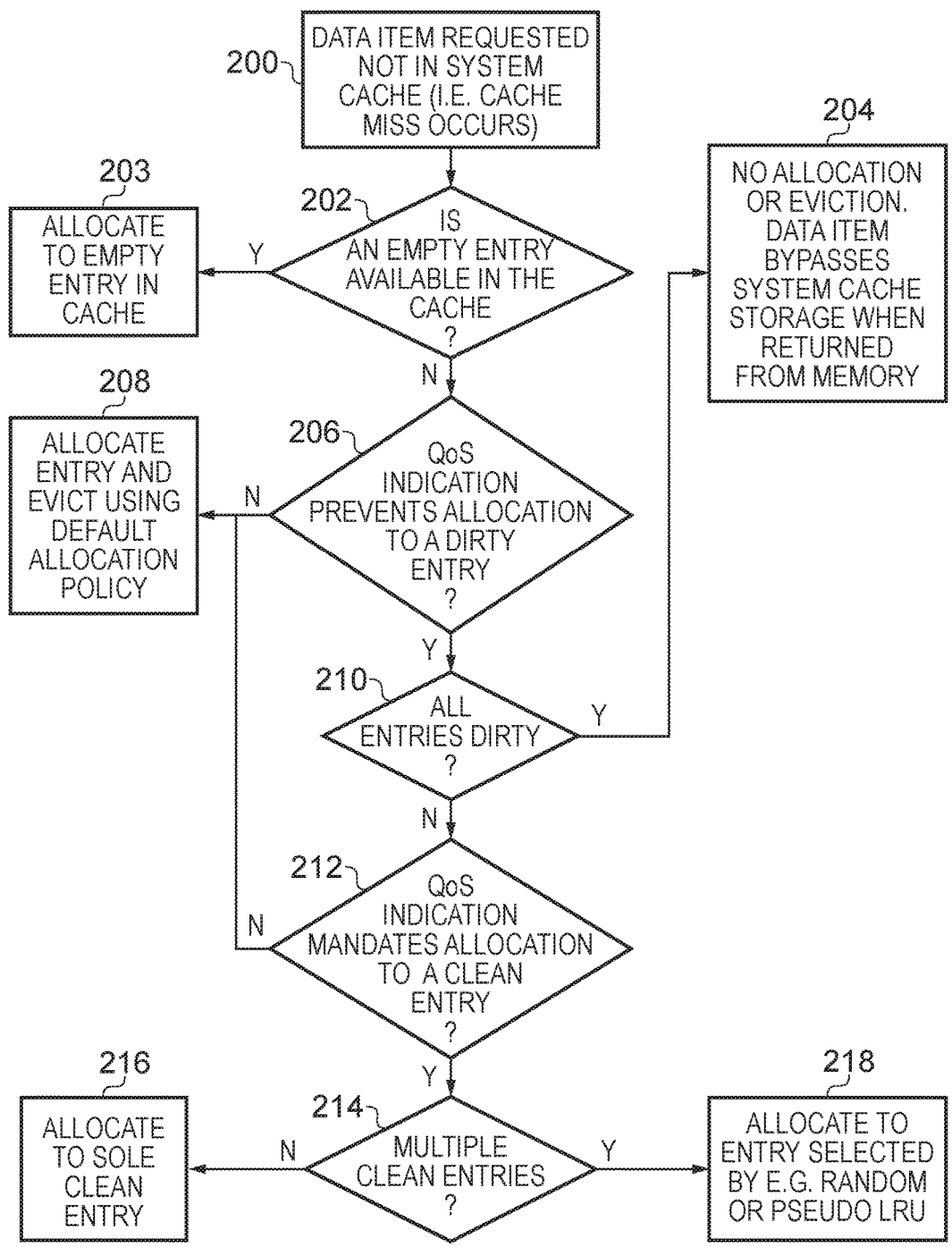
FIG. 5 shows a sequence of steps which are taken in the method of one embodiment when a cache miss occurs.

FIG. 5 shows a sequence of steps which are taken in the method of one embodiment in response to a cache miss. As illustrated the flow begins at step 200 where a cache miss occurs when it is determined that the data item which has been requested is not currently stored in the system cache. The flow then proceeds to step 202 where it is determined if an empty entry is currently available in the cache. If this is the case then the flow concludes at step 203, where that empty entry is used for the allocation of the new cache line. Otherwise the flow proceeds to step 206 where it is determined if a current quality-of-service indication prevents allocation into a dirty entry of the cache. If this is not the case then the flow concludes at step 208 where the default cache allocation policy is implemented and according to which an entry is allocated to store the data item once it is returned from memory. Otherwise (i.e. if allocation to a dirty entry is prohibited) the flow proceeds to step 210 where it is determined if all entries in the cache are currently marked as dirty. If this is the case then the flow proceeds to and concludes at step 204, where no allocation or eviction takes place. The data item (once returned from memory) bypasses the system cache storage and is transferred directly to the requesting master since no allocation is allowed to be carried out. If however (step 210) all entries in the cache are not currently marked as dirty, then at step 212 it is determined if a current quality-of-service indication mandates allocation into a clean entry of the cache. If this is not the case then the flow proceeds to step 208 where the default cache allocation policy is implemented. If however allocation must take place into a clean entry then it is determined at step 214 if there are currently multiple clean entries available in the cache. If there are not then at step 216 the sole clean entry in the cache is selected for the allocation. Otherwise at step 218 the cache line for allocation is selected on a suitable basis for example according to the above-mentioned (pseudo) random or pseudo-LRU policies.

Figure 6:
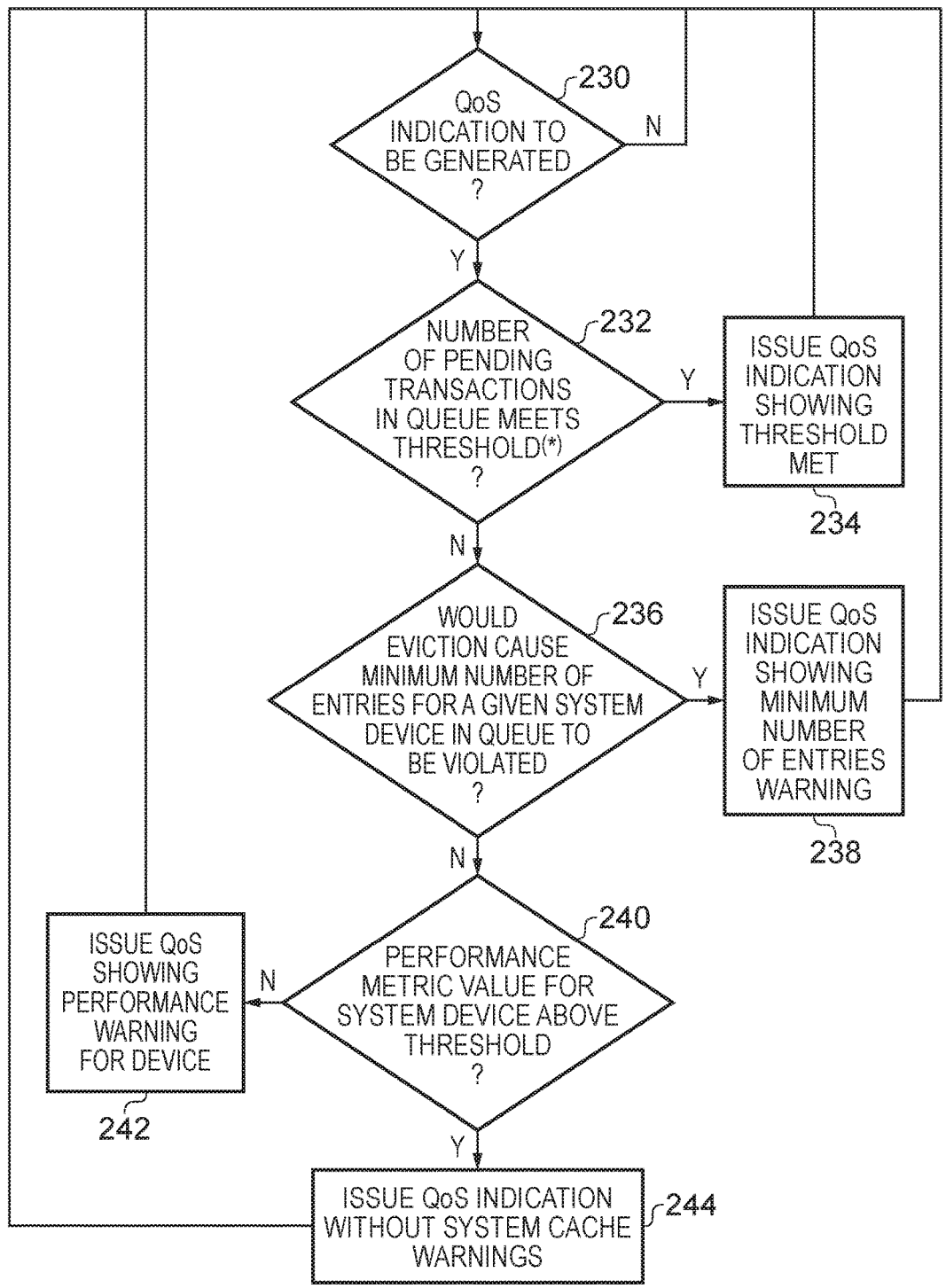
FIG. 6 shows a sequence of steps which are taken in the method of one embodiment when a quality-of-service indication is generated.

FIG. 6 shows a sequence of steps which are taken in the method of one embodiment in order to generate various quality-of-service indications. It is to be noted that this sequence of steps is to be considered in association with the embodiment shown in FIG. 2, i.e. where the system comprises a shared memory transaction queue. The flow can be considered to begin at step 230 where it is determined if a quality-of-service indication should be generated. For example the system may be configured such that quality-of-service indications are generated at regular timing intervals or in response to particular system events. The flow circulates at step 230 until this is true. Then at step 232 it is determined if the number of pending transactions in the transaction queue meets a threshold. The asterisk (*) at this step highlights that the threshold value may be dynamically maintained and is not necessary constant. If this condition is met then the flow proceeds to step 234 where quality-of-service indication is issued showing that the threshold has been met i.e. the queue is full (or close to full). As a result the cache allocation policy is modified temporarily to prevent a further eviction entry being made into the shared transaction queue. Otherwise the flow proceeds step 236 where it is determined if eviction of an entry from the system cache would cause the minimum number of entries for a given system device in the transaction queue to be violated. If this is the case the flow proceeds to step 238 where a quality-of-service indication is issued which "warns" of this condition. As a result the cache allocation policy is modified temporarily to prevent a further eviction entry being made into the shared transaction queue. Otherwise the flow proceeds to step 240, where it is determined if the performance metric value for a system device is currently above threshold. It is not then the flow proceeds to step 242, where quality-of-service indication is issued showing this performance warning. As a result the cache allocation policy is modified temporarily to seek to enable this performance metric to recover. Otherwise at step 244 a quality-of-service indication is indicated which is essentially 'all clear', i.e. no modification of the cache default allocation policy is currently required. The flow then returns to step 230.

In brief overall summary a cache to provide data caching in response to data access requests from at least one system device, and a method operating such a cache, are provided. Allocation control circuitry of the cache is responsive to a cache miss to allocate an entry of the multiple entries in the data caching storage circuitry in dependence on a cache allocation policy. Quality-of-service monitoring circuitry is responsive to a quality-of-service indication to modify the cache allocation policy with respect to allocation of the entry for the requested data item. The behaviour of the cache, in particular regarding allocation and eviction, can therefore be modified in order to seek to maintain a desired quality-of-service for the system in which the cache is found.

In the present application, the words "configured to . . . " or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. A cache to provide data caching in response to data access requests from at least one system device comprising:
    data caching storage circuitry having multiple entries to cache data items returned from memory in response to the data access requests;
    allocation control circuitry responsive to absence of a requested data item in the data caching storage circuitry to allocate an entry of the multiple entries in the data caching storage circuitry in dependence on a cache allocation policy;
    quality-of-service monitoring circuitry responsive to a quality-of-service indication to modify the cache allocation policy with respect to allocation of the entry for the requested data item; and
    transaction queue circuitry to hold at least one data transaction pending transmittal to memory in a shared memory transaction queue for multiple system devices, where the quality-of-service indication is a status indication received from the transaction queue circuitry, the status indication signifying that allocating an entry of the multiple entries in the data caching storage circuitry for caching the requested data item according to the cache allocation policy, and evicting a data item stored in the cache into the shared memory transaction queue, would cause a number of entries in the shared memory transaction queue to be available to a given system device to fall below a threshold minimum.

2. The cache as claimed in claim 1, wherein the quality-of-service monitoring circuitry is responsive to the quality-of-service indication to prevent allocation for the requested data item in a dirty entry of the multiple entries, wherein the dirty entry holds at least one data item marked as locally modified.

3. The cache as claimed in claim 2, wherein the quality-of-service monitoring circuitry is responsive to the quality-of-service indication to cause allocation for the requested data item in a clean entry of the multiple entries, wherein the clean entry holds no data items marked as locally modified.

4. The cache as claimed in claim 3, wherein the quality-of-service monitoring circuitry is responsive to presence of multiple clean entries holding data items marked as locally unmodified in the data caching storage circuitry to select one of the multiple clean entries for allocation for the requested data item on a randomized basis.

5. The cache as claimed in claim 3, wherein the quality-of-service monitoring circuitry is responsive to presence of multiple clean entries holding data items marked as locally unmodified in the data caching storage circuitry to select one of the multiple clean entries for allocation for the requested data item on a least-recently-used basis.

6. The cache as claimed in claim 2, wherein the quality-of-service monitoring circuitry is responsive to the quality-of-service indication to prevent allocation for the requested data item in any entry of the data caching storage circuitry.

7. The cache as claimed in claim 1, wherein the transaction queue circuitry comprises eviction queue circuitry to hold at least one modified data item which has been evicted from the data caching storage circuitry pending a write-back of the at least one modified data item to memory, and wherein the quality-of-service indication is a status indication received from the eviction queue circuitry.

8. The cache as claimed in claim 7, wherein the status indication indicates that at least a threshold number of modified data items are currently held in the eviction queue circuitry pending write-back to memory.

9. The cache as claimed in claim 1, comprising system performance monitoring circuitry to maintain a performance metric value for the at least one system device, wherein the quality-of-service monitoring circuitry responsive to an outcome of a comparison of the performance metric value with respect to a performance threshold value to modify the cache allocation policy with respect to the allocation of the entry for the requested data item.

10. The cache as claimed in claim 9, wherein the system performance monitoring circuitry comprises bandwidth monitoring circuitry that is responsive to elapse of a predetermined time period to decrease the bandwidth performance value and is responsive to issuance of an access to memory for the at least one system device to increase the bandwidth performance value.

11. The cache as claimed in claim 9, wherein the system performance monitoring circuitry comprises bandwidth monitoring circuitry to maintain a bandwidth performance value for the at least one system device, wherein the quality-of-service monitoring circuitry responsive to an outcome of a comparison of the bandwidth performance value with respect to a bandwidth performance threshold value to modify the cache allocation policy with respect to the allocation of the entry for the requested data item.

12. The cache as claimed in claim 1, wherein the cache is a system cache to provide data caching in response to data access requests from multiple system devices.

13. A method of operating a cache to provide data caching in response to data access requests from at least one system device comprising:
- caching data items returned from memory in response to the data access requests in data caching storage having multiple entries;
- in response to absence of a requested data item in the data caching storage, allocating an entry of the multiple entries in the data caching storage in dependence on a cache allocation policy;
- modifying the cache allocation policy with respect to allocation of the entry for the requested data item in response to a quality-of-service indication; and
- holding at least one data transaction pending transmittal in a shared memory transaction queue to that holds pending memory transactions for multiple system devices,
- where the quality-of-service indication is a status indication that signifies allocating an entry of the multiple entries in the data caching storage circuitry for caching the requested data item according to the cache allocation policy, and evicting a data item from the cache into the shared memory transaction queue, would cause a number of entries in the shared memory transaction queue for to be available to a given system device to fall below a threshold minimum.

14. A cache to provide data caching in response to data access requests from at least one system device comprising:
- means for caching data items returned from memory in response to the data access requests in data caching storage having multiple entries;
- means for allocating an entry of the multiple entries in the data caching storage in dependence on a cache allocation policy in response to absence of the requested data item in the data caching storage;
- means for modifying the cache allocation policy with respect to allocation of the entry for the requested data item in response to a quality-of-service indication; and
- means to hold at least one data transaction pending transmittal to memory in a shared memory transaction queue for multiple system devices,
- where the quality-of-service indication is a status indication received from the transaction queue circuitry,
- the status indication signifying that allocating an entry of the multiple entries in the data caching storage circuitry for caching the requested data item according to the cache allocation policy, and evicting a data item stored in the cache into the shared memory transaction queue, would cause a number of entries in the shared memory transaction queue to be available to a given system device to fall below a threshold minimum.

* * * * *